United States Patent [19]

Keilholz

[11] 4,192,185

[45] Mar. 11, 1980

[54] FLOWMETER FOR LIQUIDS

[75] Inventor: Friedrich Keilholz, Ennepetal, Fed. Rep. of Germany

[73] Assignee: Ludwig Peithmann KG, Bünde, Fed. Rep. of Germany

[21] Appl. No.: 882,419

[22] Filed: Mar. 1, 1978

[30] Foreign Application Priority Data

Mar. 2, 1977 [DE] Fed. Rep. of Germany ....... 2708955

[51] Int. Cl.$^2$ .............................................. G01F 3/14
[52] U.S. Cl. ........................................ 73/243; 73/249
[58] Field of Search .......................... 73/239, 243, 249

[56] References Cited

U.S. PATENT DOCUMENTS

| 97,097 | 11/1869 | Leach | 73/243 |
|---|---|---|---|
| 388,714 | 8/1888 | Perret | 73/243 |
| 995,278 | 6/1911 | Mulhall | 73/243 |
| 1,956,282 | 4/1934 | Granberg | 73/243 |
| 1,974,202 | 9/1934 | Blum | 73/243 |
| 3,344,667 | 10/1967 | Maltby | 73/239 |
| 4,055,084 | 10/1977 | Wilde | 73/249 |

*Primary Examiner*—Herbert Goldstein
*Attorney, Agent, or Firm*—Karl F. Ross

[57] ABSTRACT

A flowmeter for measuring the throughput of a liquid from a source to a load, especially for gasoline, diesel oil, heating oil and the like, comprises at least two measuring cylinders having floating pistons and respective reversing elements which have two positions in which the reversing elements can be temporarily retained. A first reversing element is controlled by the first measuring cylinder and controls the reversal of flow of the liquid to the second measuring cylinder and vice versa. Means is provided for counting the strokes of each of the floating pistons to signal the quantity of displaced liquid.

9 Claims, 8 Drawing Figures ylinder
FLOWMETER FOR LIQUIDS

FIELD OF THE INVENTION

The present invention relates to a flowmeter for measuring the throughput of a liquid from a source to a load and, more particularly, to a quantity meter for liquid such as gasoline, diesel oil, heating oil and the like.

BACKGROUND OF THE INVENTION

In many applications it is advantageous to know the throughput of a liquid from a source to a load. An example is the measurement of the flow of, say, fuel oil from a tank to a furnace. Other applications include, as will be apparent hereinafter, measurements of the flow of gasoline from the tank of an automotive vehicle to the engine, measurements of the flow of diesel oil in similar applications and, more generally, the measurement of liquid flows quantitatively between a supply, pump or other source of the liquid and a drain or other load therefor.

It has been proposed heretofore to provide a flowmeter for the purposes described which comprises a measuring cylinder in which a floating piston is reciprocatable, the piston subdividing the measuring cylinder into two chambers which are alternately filled with the liquid and drained. The strokes of the piston are counted to indicate the quantity of displaced liquid, i.e. the quantity of liquid transferred between the source and the load through the measuring cylinder.

The measuring cylinder is controlled by a control cylinder or valve and within the control cylinder there is provided a movable floating control piston. The control piston is provided with retaining means for temporarily holding it in its opposite positions.

Flowmeters for measuring the throughput of a liquid from a source to a load in the above-described manner are known in various configurations including that which has been described above. An alternative form of flowmeter is the so-called dynamic flowmeter. The flowmeter which has been described in some greater detail previously is a so-called volumetric flowmeter. Volumetric flowmeters can operate as discontinuous or continuous units.

Flowmeters for liquids are employed for a variety of purposes and those which are of greatest concern at the moment are the applications for gasoline, diesel oil and heating oil.

More particularly, it is vital in many cases to provide a high-precision flowmeter to determine the instantaneous specific fuel consumption of an automotive vehicle.

Since dynamic flowmeters are density and viscosity dependent, they cannot generally be used when exact measurements are required and it is not possible to maintain either the density or viscosity of the liquid constant. It may be noted that gasoline, depending upon the composition of the fuel and temperature fluctuations, suffers a specific gravity variation of up to 10%.

The flowmeter which has been described above is of the type illustrated in German open application (Offenlegungsschrift) DT-OS 24 00 502 (see also U.S. Pat. No. 4,055,084). This unit is a volumetric flowmeter which provides reasonably accurate measurements over a wide measuring range, i.e. over throughputs which can vary widely, and has the advantage that it generates only a small pressure drop between the source and the load. Nevertheless, the measuring precision of such a flowmeter is subject to certain errors which will be elucidated below.

The flowmeter as noted comprises cylinder chambers on opposite sides of the measuring piston which are connected with the cylinder chambers of the control cylinder which is disposed between the liquid inlet and the liquid outlet (see FIGS. 1 and 2 of this publication).

The liquid entering the inlet on the flowmeter passes, depending upon the position of the control piston, into one or the other of the cylinder chambers of the measuring cylinder, displaces the measuring piston in the direction of the other cylinder and displaces the liquid volume in this other cylinder through the outlet.

When the measuring piston has reached its end position, i.e. the piston can no longer be displaced by the liquid entering the flowmeter, there develops in the first cylinder chamber of the control cylinder, a control pressure which is effective upon the control piston and releases the latter from its retaining means. The control piston is then moved and the direction of pressurization of the measuring piston and the measuring cylinder is reversed. The measuring piston is then displaced in the opposite direction.

In the operation of this unit there is an undesirable displacement of a certain amount of liquid which can be referred to as the changeover volume. This changeover volume does not pass through the cylinder chambers of the measuring cylinder in the sense that it participates in the stroke of the piston and thus is not measured by counting the strokes of the measuring piston. To take into consideration this changeover volume, a given factor must be added to the volume displacement of the measuring cylinder for each count of the stroke of the piston. With the prior-art device, however, the changeover volume is not constant and depends upon the flow velocity. As a consequence, an error is imparted to the measurement given by the system of this publication.

Mention should be made of the fact that a flowmeter for liquids is known (see "Precision Automotive Fuel, Economy Testing System" published by Fluidyne Instrumentation, Okland, California), in which four measuring cylinders are provided. The pistons within these cylinders are connected via piston rods to a common crank shaft and a single counting element is provided to count the piston strokes of the measuring piston. This flowmeter is, naturally, extremely expensive and difficult to fabricate and, because of the more complex mechanism, may not be as reliable in practice as a system using free-floating measuring pistons.

An additional disadvantage of this arrangement is the fact that it also is sensitive to the relationship between the positions of the pistons and the various flow cross sections of the measuring cylinder.

OBJECTS OF THE INVENTION

It is an object of the present invention to provide a low-cost flowmeter for measuring the throughput of a liquid from a source to a load which uses floating pistons and which nevertheless eliminates the problems encountered with earlier floating-piston flowmeters.

Another object of the invention is to provide a low-cost, high-precision and low-pressure-drop flowmeter which is especially advantageous in measuring the instantaneous throughput of gasoline, diesel oil or heating oil or other fuels.

SUMMARY OF THE INVENTION

These objects and others which will become apparent hereinafter are attained, in accordance with the present invention, which provides a flowmeter which is an improvement on the prior-art volumetric flowmeter which comprises a single measuring cylinder, a free-floating measuring piston this cylinder, a control cylinder, a free-floating control piston within the control cylinder and retaining means for temporarily retaining the control piston in its extreme positions, the system also including a counting element for counting the piston strokes of the measuring piston.

The improvement of the present invention provides a second measuring cylinder, a second measuring piston, a second control cylinder and a second control piston, between the second control cylinder and the second control piston there being provided retaining means. According to the invention, the first control piston regulates the movement of the second measuring piston while the second control piston regulates the movement of the first measuring piston.

With the flowmeter of the present invention, it is possible to provide more than two measuring cylinders, more than two measuring pistons, more than two control cylinders and more than two control pistons. When a greater number than two units are provided, the first measuring piston is controlled by the second control piston, the second measuring piston is controlled by the third control piston, etc., and the last measuring piston is controlled by the first control piston. The subsequent discussion of the flowmeter of the present invention will, however, be made with reference to two measuring cylinders, two measuring pistons, two control cylinders, two control pistons etc. Nevertheless it should be borne in mind that an increase in the number of these units is possible in the manner described above.

In the most general terms, therefore, a flowmeter for measuring the throughput of a liquid from a source to a load in accordance with the present invention can comprise at least a first and a second measuring cylinders, each provided with a respective floating piston subdividing same into two chambers, and at least a first and a second two-position reversing means for controlling the movement of these pistons. The first reversing means is connected to the second cylinder for supplying one of the chambers thereof with liquid from the source in one position of the first reversing means and for supplying the other of said chambers of said second cylinder from the source in the other position of the first reversing means whereby the chambers are alternately connected to the source and the load so that each stroke of each piston is a measure of a predetermined quantity of displaced liquid. Means is provided for temporarily retaining each of the reversing means in each of its positions. The flowmeter also includes means coupling the first cylinder with the first reversing means to change the positions thereof upon the completion of the stroke by the piston of the first cylinder, and counting means responsive to the strokes of each piston for signaling the quantity of displaced liquid.

The first control piston thus regulates the movement of the second measuring piston and the second control piston regulates the movement of the first measuring piston.

Thus the "coupling" between the first measuring piston and the first control piston as well as between the second measuring piston and the second control piston, in accordance with the present invention, can be hydraulic. The "coupling" can, however, also be mechanical using state-of-the-art techniques. In the subsequent description of the flowmeter of the present invention, it will be understood that either the hydraulic or mechanical coupling may be provided and that a system using a hydraulic coupling may make use of the teachings below regarding a mechanical coupling and vice versa.

It should be understood further that the system of the present invention does not completely eliminate the formation of a changeover volume. However, with the system of the present invention, the changeover volume can be exactly determined by the geometry of the control cylinder and control piston and can be constant under all conditions of operation so that the changeover volume can be simply added to the measuring cylinder volume - liquid-displacement volume (hereinafter displacement volume) and the source of error of the prior-art floating-piston system can be completely eliminated.

According to a feature of the invention, the first control cylinder is formed as the measuring cylinder or part of the measuring cylinder of the second measuring-cylinder-and-piston arrangement while the second control cylinder and piston form respectively part of the first measuring cylinder and piston, respectively. In this preferred embodiment of the present invention, only two cylinders and two pistons are required, whereby each acts during one phase as the control cylinder while the other acts as the measuring cylinder and the latter becomes the control cylinder while the former becomes the measuring cylinder in a second phase.

In this preferred embodiment of the present invention, moreover, it is possible to eliminate or diminish the changeover volume so that the displacement volume is also the changeover volume. Hence with this embodiment, a distinct changeover volume is no longer provided and the changeover volume does not give rise to any errors of any kind.

It has been found to be advantageous, moreover, to provide all of the measuring and control cylinders in a single flowmeter housing and to form all of the ducts, passages and the like connecting these cylinders and connecting various units with the source and the load, within the housing. The result is a highly compact flowmeter which only requires an inlet and an outlet for connection in the liquid circuit. The measuring and control pistons themselves may be provided with passages affording connection between the measuring and control cylinders.

According to another feature of the invention, the retaining means for temporarily retaining each of the reversing means (control pistons) in each of its positions can be a permanent magnet body which cooperates with a counterbody of magnetically permeable or ferromagnetic material. Alternatively, two permanently magnetic bodies may be provided in the two elements which are to engage when the control piston is retained in its extreme positions. One of the permanent magnetic bodies may be provided upon the cylinder wall member while the other permanent magnetic body is provided upon the piston member.

It has been found to be advantageous to provide adjustability of the retaining means along the axis of the piston. This permits the displacement volume of the measuring piston to be exactly determined.

According to a further feature of the invention, the counting means includes a proximity-type electronic switch, i.e an electronic switch of the contactless type, the output of which is provided to an adding-type counter. A suitable proximity switch may be a reed switch which can be affected by the magnet carried by the control piston or the measuring piston.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
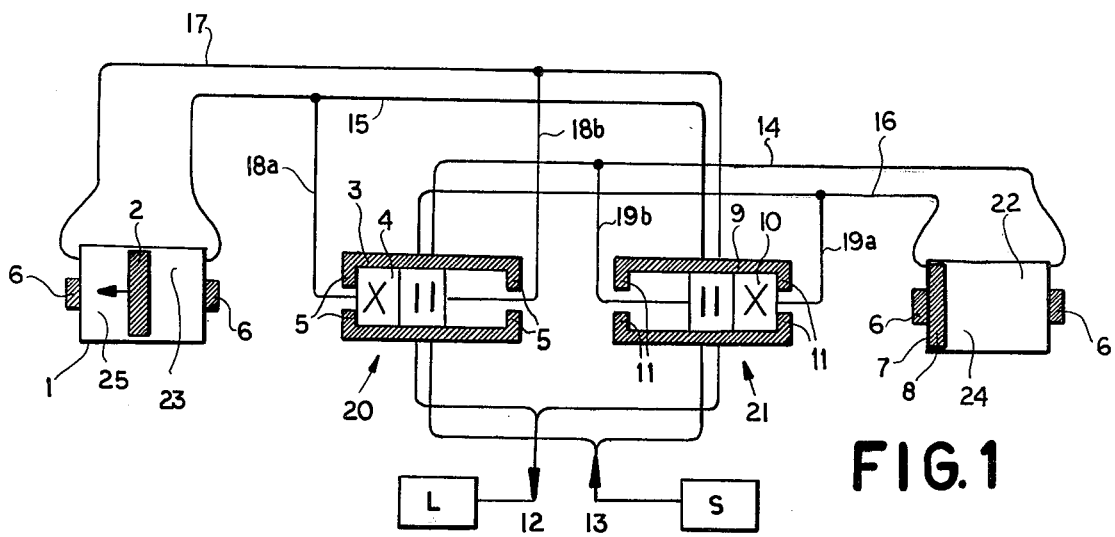
FIGS. 1-3 are hydraulic flow diagrams illustrating a first embodiment of a flowmeter of the present invention in various stages of functioning.

The flowmeters shown in the drawing have been designed primarily for the volumetric measurement of liquids, especially for gasoline, diesel oil and heating oil. The source of the liquid is represented at S while the drain or load is represented at L. The source may be a fuel pump and the load may be a carburetor of an internal-combustion engine or, in case of a diesel engine, the fuel injection system. A counter C is electrically connected to the stroke detector, which can be a reed switch operated by a magnet carried by the floating piston, in the manner to be described below, with the count being summed in the counter.

Figure 2:
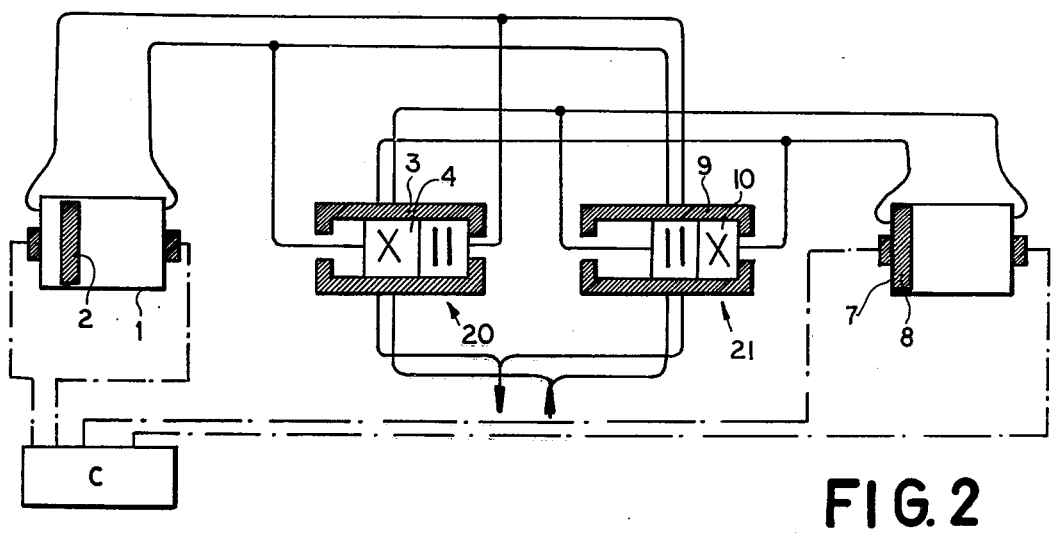
Figure 3:
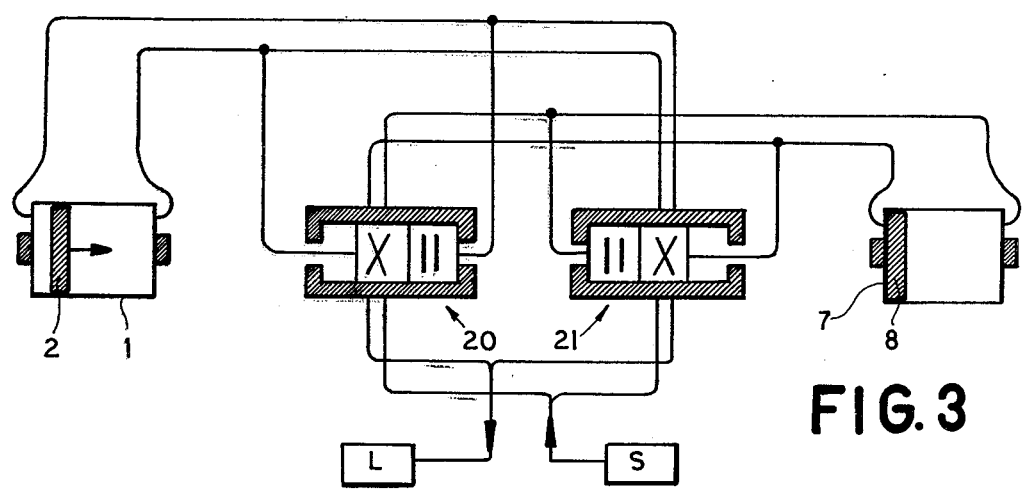

The flowmeter shown in FIGS. 1-3 comprises a first measuring cylinder 1, a floating piston 2 within the first measuring cylinder 1, a first control cylinder 3 and a floating first control piston 4 within the cylinder 3. Between the first control cylinder 3 and the first control piston 4 there is effective a retaining means 5 which can be a pair of permanent magnets to retain the piston 4 in each of its opposite extreme positions. The two extreme positions of the piston 4 have been shown in FIGS. 1 and 2. A counting element 6 cooperates with the piston 2 to provide an output which may be counted to signal the displacement of the piston 2 and hence the volume passed through the measuring cylinder 1.

According to the invention, a second measuring cylinder 7, a second measuring piston 8, a second control cylinder 9, and a second control piston 10 are provided, between the second control cylinder 9 and the second control piston 10 there being provided a retaining means 11 similar to the retaining means 5 previously described.

The first control piston 3 controls the movement of the second measuring piston 8 while the second control piston 10 regulates the movement of the first measuring piston 2. The "coupling" between the first measuring piston 2 and the first control piston 4 and between the second measuring piston 8 and the second control piston 10 is, as will be apparent from the drawing, a hydraulic coupling.

The flowmeter of FIGS. 1-3 also comprises a liquid inlet 12 connected to the source S and a liquid outlet 13 connected to the load L. A plurality of conduits 14-19 are provided. The conduit 14 connects the one output port of the two-position reversing means 20, formed by the first control cylinder 3 and the first control piston 4, to one chamber 22 of the second measuring cylinder 8. A corresponding conduit 15 connects the corresponding port of the second two-position reversing means 21 to the chamber 23 of the first measuring cylinder 1. A conduit 16 connects the other port of the first two-position reversing means 20 with the other chamber 24 of cylinder 7 while line 17 connects the other port of the reversing means 21 to the chamber 25 of cylinder 1. Conduits 18a and 18b connect ducts 15 and 17 to the opposite sides of the cylinder 3 while conduits 19a and 19b connect ducts 14 and 16 to the opposite sides of cylinder 9.

In FIGS. 4-8, corresponding reference numerals have been used to identify correspondingly functioning elements of FIGS. 1-3. Thus member 8a is a measuring piston equivalent to member 8 while member 4a is a control piston equivalent to member 4. A similar relationship is applicable to members 1a and 9a and 2a and 10a.

In this embodiment the inlet and outlet are represented at 12 and 13, respectively. The holding means or means for means for temporarily retaining the control piston in its extreme positions are also designated at 5 while reference numeral 6 is used to indicate the proximity switch for signaling a stroke of the measuring piston.

In the embodiment of FIGS. 4-8, the first control cylinder 3a forms part of or is the same as the second measuring cylinder 7a (see especially FIG. 4) while the first control piston 4a is the same as the second measuring piston 8a. The first measuring cylinder 1a is part of or the same as the second control cylinder 9a and the first measuring piston 2a is the same as or is part of the second control piston 10a.

In this embodiment, therefore, only two distinct cylinder bores and two distinct piston members are required whereby the first and second cylinders each function alternately as control cylinders 3a or 9a and as measuring cylinders 7a or 1a. The first and second pistons thus function each one time as the control piston 4a or 10a and one time as the measuring piston 8a or 2a.

In this embodiment, moreover, all of the cylinders are provided in a common flowmeter housing 26 and the measuring and control cylinders 1a or 7a and 9a or 3a within the housing 26 and within the measuring and control pistons 2a or 8a and 10a or 4a are provided with passages or bores 27-32 fulfilling the functions of the conduits and ducts 14-17, 18a, 18b and 19a, 19b respectively.

Each of the retaining means 5 or 11 in this embodiment comprises a retaining body 5a or 11a of permanent magnet material and a counter body 5b or 11b of ferromagnetic material or oppositely poled permanently magnetic material. The retaining bodies 5a or 11a are threaded into the housing 26 to permit adjustment of the strokes of the measuring pistons. Each retaining member 5b or 11b is provided upon the respective piston.

The proximity switch elements 9 are contactless electronic switches which are received in recesses in the end walls of the respective cylinders. The central passages 31 and 32 through the pistons are formed with radial bores 31a and 31b and 32a and 32b, respectively.

Below I have described first the operation of the flowmeter of FIGS. 1-3 which will make more readily apparent the operation of the embodiment of FIGS. 4-8.

The movable parts of the flowmeter initially have the position shown in FIG. 1. Liquid entering through the inlet 12 flows via the reversing means 21 and duct 15 into the right-hand cylinder chamber 23 of the measuring cylinder 1 and drives the measuring piston 2 to the left. The liquid in the left-hand chamber 25 is thus displaced to the load via outlet 13 and the reversing means 21. When the measuring piston 2 reaches its left-hand extreme position, it activates the switch element 6 to signal a count to the counter and comes to a halt. There is an instantaneous increase in the pressure in line 15 which is applied via line 18a as a changeover pressure to the reversing means 20. The latter is shifted into the position shown in FIG. 2. Liquid is thus permitted to flow to the left-hand chamber 24 of the measuring cylinder 7 and to displace the piston 8 thereof to the right. The liquid in the right-hand chamber 22 is driven out through the reversing means 20 and the outlet 13 until the piston 8 reaches its extreme position in which it again registers a count in the counter. The immobilization of the piston 8 in its extreme right-hand position again causes a brief pressure increase in line 16, which is communicated via line 19a to the reversing means 21 to shift the position of the piston 10 thereof (see FIG. 3). The liquid now flows via the reversing unit 21 to the left-hand chamber 25 to displace the piston 2 to the right and drive the liquid in chamber 23 to the outlet 13. When the piston 2 reaches its extreme right-hand position, the operation repeats in a similar sequence.

It is important to appreciate that in the embodiment of FIGS. 1-3, there is a changeover volume, namely, the volume used for controlling the reversing units 20 and 21. However, these volumes are constant and can be precisely determined so that they can be added to the displacements by the pistons 2 and 8 and hence the measured volume.

Figure 4:
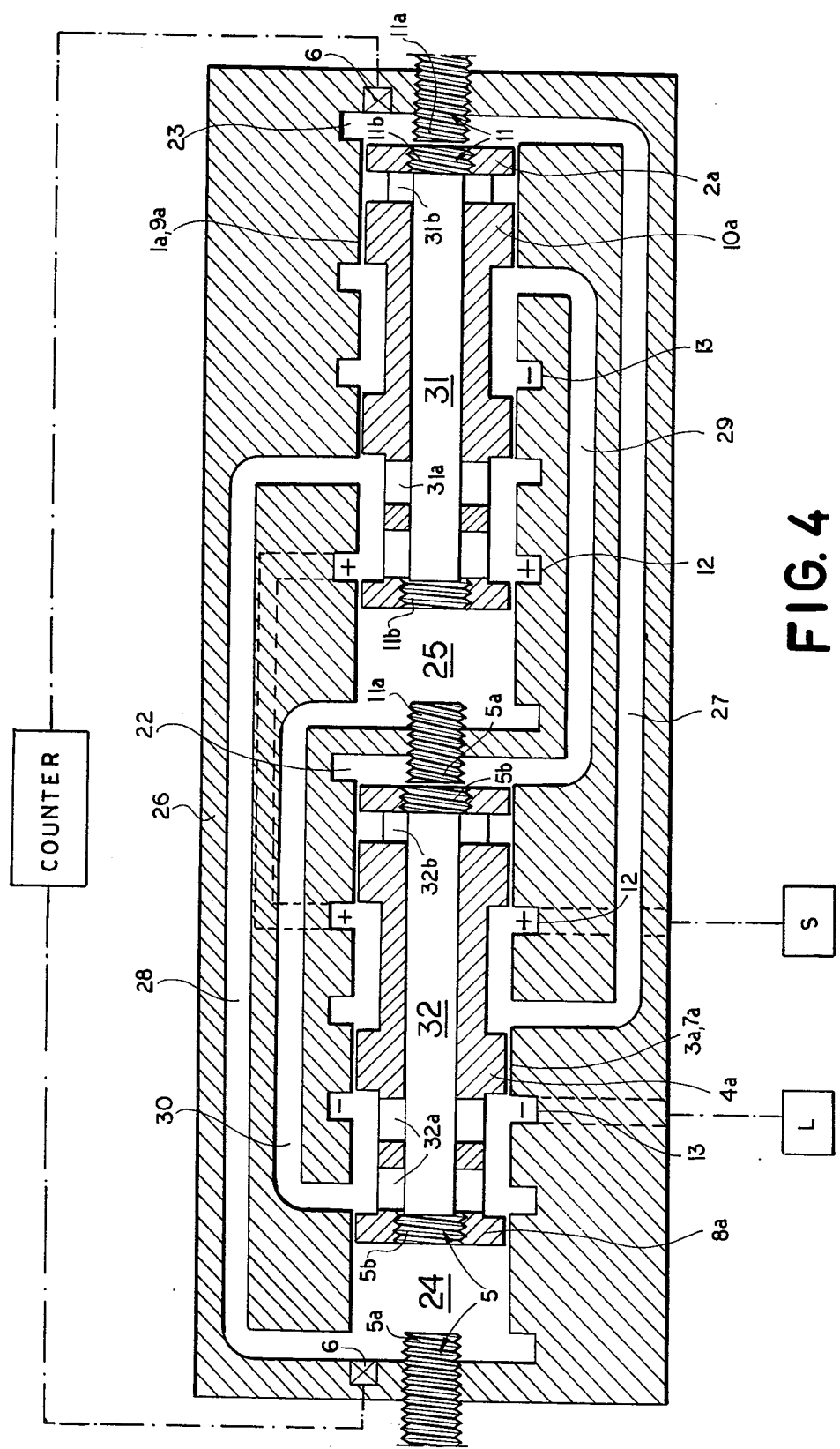
FIGS. 4-8 are axial cross-sectional views through a single-housing flowmeter according to a second embodiment of the invention, also shown diagrammatically, the successive Figures illustrating successive operating positions of the movable parts of the flowmeter.
Figure 5:
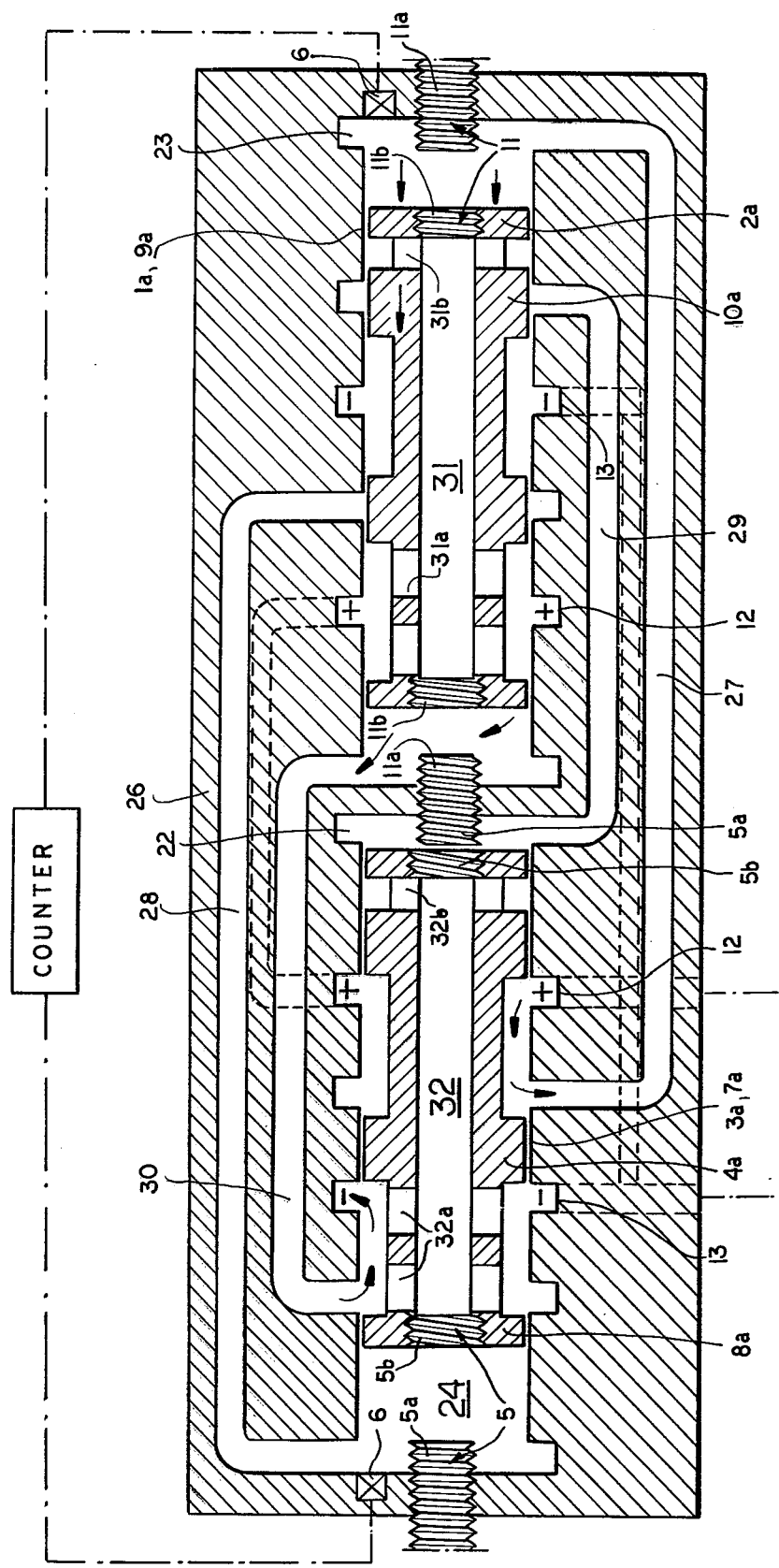
Figure 6:
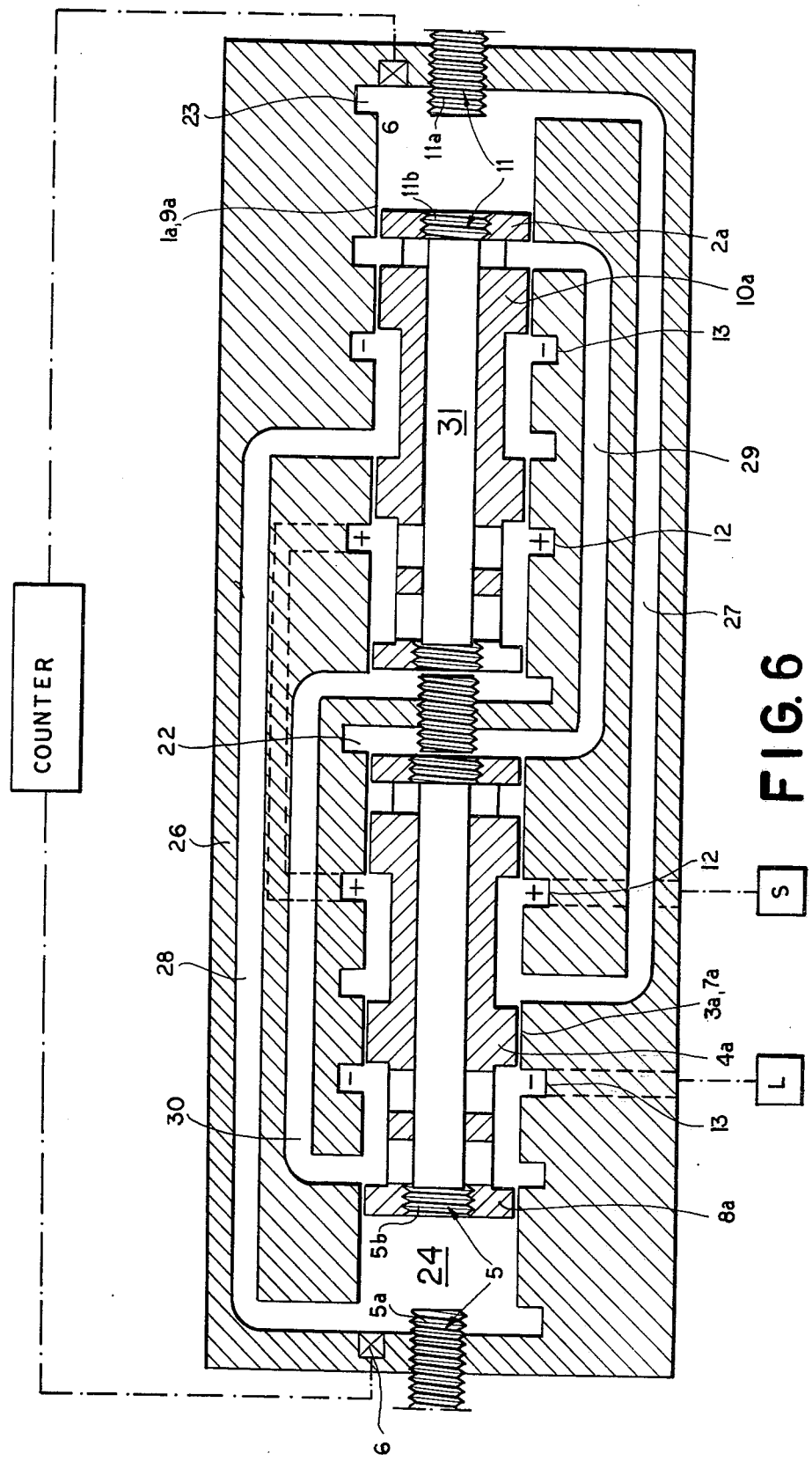
Figure 7:
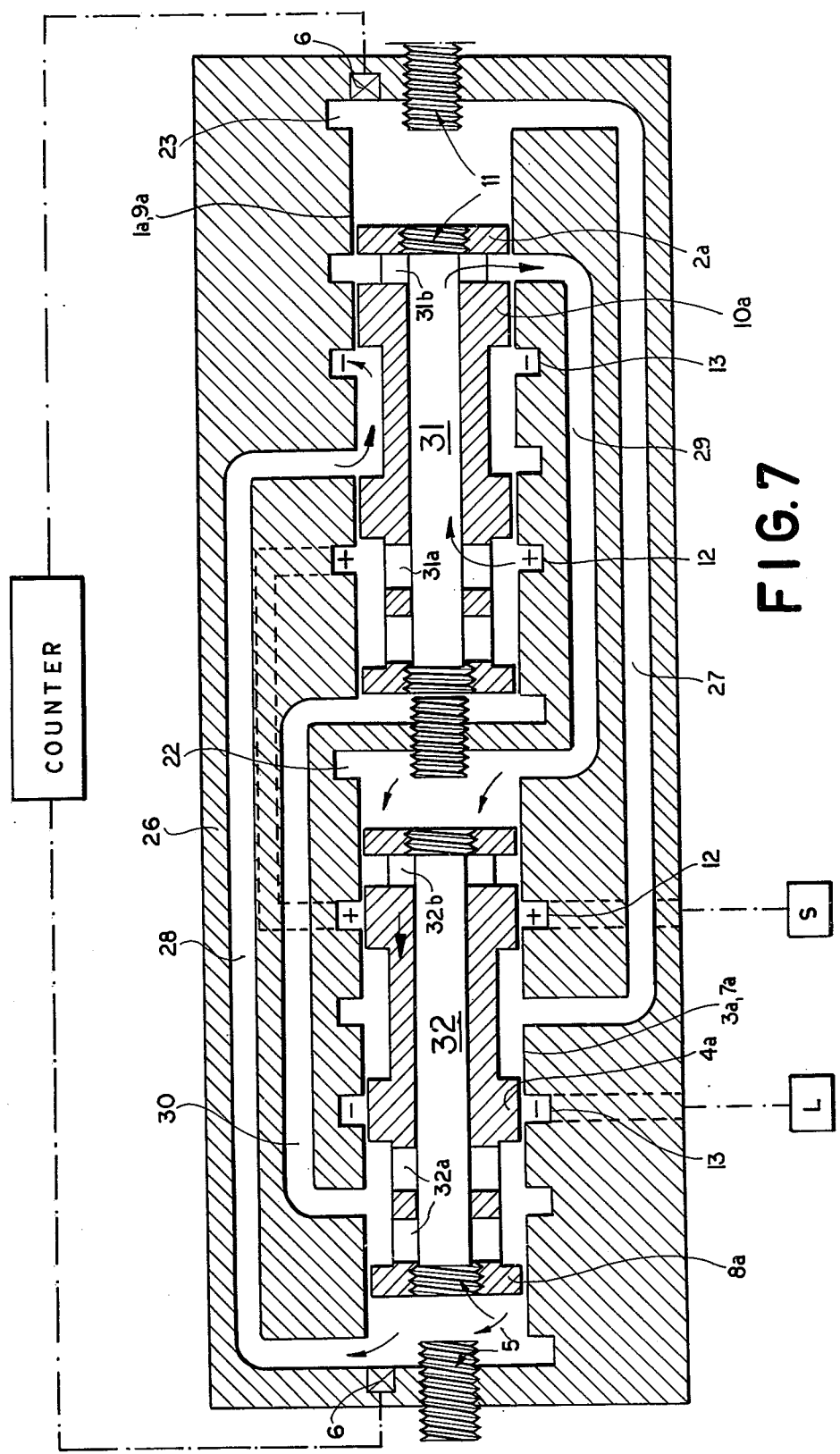
Figure 8:
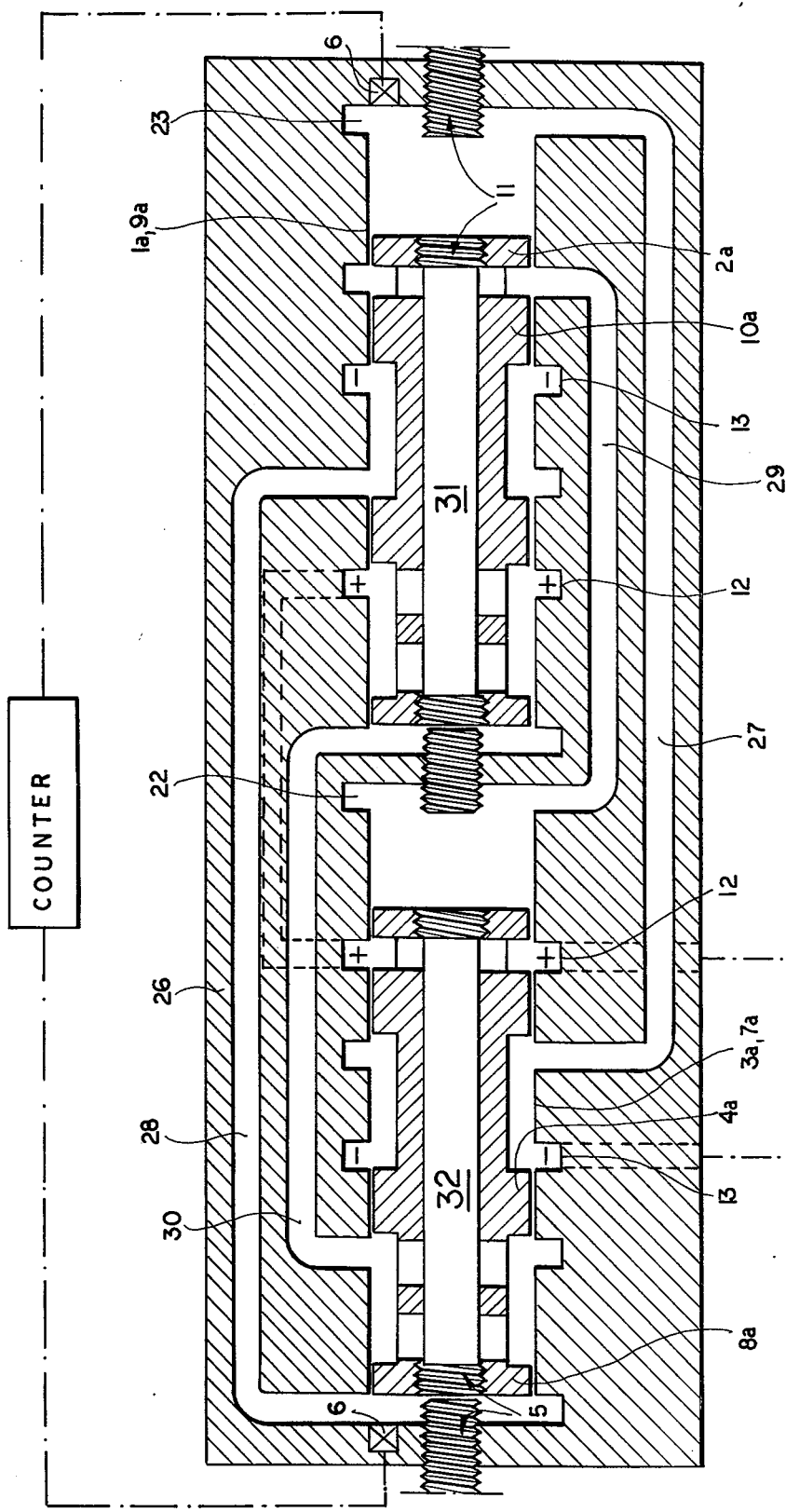

Initially, in FIGS. 4-8, the measuring and control piston 2a, 10a and the measuring and control piston 4a, 8a have the positions shown in FIG. 4. The liquid flows from the inlet 12 via the passage 27 into the right-hand cylinder chamber 23 of the measuring and control cylinder 1a, 9a and via the passage 28 into the left-hand cylinder chamber 24 of the control and measuring cylinder 3a, 7a. Since both of the pistons are in their right-hand extreme positions, only the liquid which passes via conduit 27 into the chamber 23 is effective in a control mode.

The liquid displaces the measuring and control piston 2a, 10a to the left (see FIG. 5) to thereby displace liquid from chamber 25 and passage 30 to the outlet 13.

When the piston 2a, 10a reaches its left-hand extreme position (FIG. 6) there is a brief increase in the pressure in passages 31 and 29 and in the right-hand cylinder chamber 22 of the control and measuring cylinder 3a, 7a so that the control and measuring piston 4a, 8a is displaced to the left. When the latter piston reaches its left-hand extreme position, after the liquid in chamber 24 has been driven out through the outlet 13, see FIG. 8, there is a brief pressure increase in the passages 32 and 30 as well as in the left-hand cylinder chamber 25 of the measuring and control cylinder 1a, 9a which tends to displace the piston 2a, 10a to the right. The operation of the system repeats with each stroke of the piston generating a signal via the proximity switches 6 which is counted in the counter C and registered to indicate the volume of fluid displaced.

In the embodiment of FIGS. 4-8, a changeover volume is no longer involved and the changeover volume on one side of the piston ultimately becomes the displaced volume when the piston is driven in the opposite direction.

I claim:

1. A flowmeter for measuring the throughput of a liquid from a source to a load, said flowmeter comprising:
   at least a first and a second measuring cylinders, each provided with a respective free floating piston subdividing same into two chambers;
   at least a first and a second two-position reversing means for controlling the movement of said pistons, said first reversing means being connected to said second cylinder for supplying one of the chambers thereof with liquid from said source in one position of said first reversing means and for supplying the other of the chambers of said second cylinder with liquid from said source in the other position of said first reversing means, said second reversing means being connected to said first cylinder for supplying one of the chambers thereof with liquid from said source in one position of said second reversing means and for supplying the other chamber of said first cylinder with liquid from said source in the other position of said second reversing means, whereby said chambers are alternately connected to said source and said load so that each stroke of each piston is a measure of a predetermined quantity of displaced liquid;
   means associated with each of said reversing means for temporarily retaining each of said reversing means in each of its positions; and
   counting means associated with both of said cylinders, responsive to the strokes of each piston for signaling the quantity of displaced liquid, the first and second reversing means being constituted respectively as a first control cylinder receiving a first control piston and a second control cylinder receiving a second control piston, said first control cylinder being formed as part of said second measuring cylinder and said first control piston being formed as part of said second flating piston, the first measuring cylinder being formed with said second control cylinder and the first floating piston being formed with said second control piston.

2. The flowmeter defined in claim 1 wherein all of said cylinders are provided in a common flowmeter housing.

3. The flowmeter defined in claim 2 wherein said cylinders are interconnected within said housing by passages.

4. The flowmeter defined in claim 3 wherein said pistons are provided with passages interconnecting said cylinders.

5. The flowmeter defined in claim 1 wherein said temporary retaining means includes a permanent magnet body, each of said reversing means including a stationary member and a movable member, said body being provided on one of said members, the other said members being formed with a ferromagnetic material magnetically cooperating with said body.

6. The flowmeter defined in claim 1 wherein each of said temporary retaining means includes a pair of permanent magnetic bodies.

7. The flowmeter defined in claim 1, further comprising means for adjusting the positioning of said temporary retaining means to control the stroke of a respective piston.

8. The flowmeter defined in claim 1 wherein said counting means includes at least one contactless electronic switch cooperating with each of said floating pistons.

9. A flowmeter, especially for gasoline, diesel oil, heating oil and the like, which comprises a first measuring cylinder (1), a free floating first measuring piston (2) movable in said first measuring cylinder (1), a first control cylinder (3), a first free floating control piston (4) movable in said first control cylinder (3), first retaining means (5) between the first control piston (4) and the first control cylinder (3), and a counting element for counting the piston strokes of the first measuring piston (2), the improvement which comprises: a second measuring cylinder (7), a second measuring piston (8) movable in a second measuring cylinder (7), a second control cylinder (9), a second control piston (10) movable in said second control cylinder (9), second retaining means (11) effective between the second control cylinder (9) and the second control piston and and means coupling said cylinders so that the first control piston (4) controls the movement of the second measuring piston (8) and the second control piston (10) controls the movement of the first measuring piston (2), the first control cylinder (3) being formed unitarily with the second measuring cylinder (7), the first control piston (4) being formed unitarily with the second measuring piston (8), the first measuring cylinder (1) being formed unitarily with the second control cylinder (9) and the first measuring piston (2) being formed unitarily with the second control piston (10).

* * * * *